(12) United States Patent
Grote

(10) Patent No.: US 12,209,861 B2
(45) Date of Patent: Jan. 28, 2025

(54) FREQUENCY SHIFTER FOR HETERODYNE INTERFEROMETRY MEASUREMENTS AND DEVICE FOR HETERODYNE INTERFEROMETRY MEASUREMENTS HAVING SUCH A FREQUENCY SHIFTER

(71) Applicant: CHAMARTIN LABORATORIES LLC, Wilmington, DE (US)

(72) Inventor: Richard Grote, Rancho Cucamonga, CA (US)

(73) Assignee: CHAMARTIN LABORATORIES LLC, Wilmington, DE (US)

( * ) Notice: Subject to any disclaimer, the term of this patent is extended or adjusted under 35 U.S.C. 154(b) by 102 days.

(21) Appl. No.: 17/757,048

(22) PCT Filed: Dec. 11, 2020

(86) PCT No.: PCT/IB2020/001033
§ 371 (c)(1),
(2) Date: Jun. 8, 2022

(87) PCT Pub. No.: WO2021/116764
PCT Pub. Date: Jun. 17, 2021

(65) Prior Publication Data
US 2023/0046152 A1 Feb. 16, 2023

Related U.S. Application Data

(60) Provisional application No. 63/060,581, filed on Aug. 3, 2020, provisional application No. 63/016,897, filed
(Continued)

(51) Int. Cl.
*G01B 9/02056* (2022.01)
*G01B 9/02* (2022.01)
(Continued)

(52) U.S. Cl.
CPC ..... *G01B 9/02057* (2013.01); *G01B 9/02007* (2013.01); *G01B 9/02051* (2013.01);
(Continued)

(58) Field of Classification Search
CPC . G01B 9/02007; G01B 9/02057; G02F 1/212; G02F 1/225
See application file for complete search history.

(56) References Cited

U.S. PATENT DOCUMENTS 9,494,567 B2 11/2016 Islam
2002/0015155 A1* 2/2002 Pechstedt ............. G01B 9/0209
356/477
(Continued)

FOREIGN PATENT DOCUMENTS

EP   0 251 632 A2   1/1988
JP   06148708 A     5/1994
(Continued)

OTHER PUBLICATIONS

Ip, Ezra et al. "Coherent detection in optical fiber systems". Optics Express, vol. 16, No. 2, Jan. 21, 2008, pp. 753-791. (Year: 2008).*
(Continued)

*Primary Examiner* — Michael A Lyons
(74) *Attorney, Agent, or Firm* — Brownstein Hyatt Farber Schreck, LLP

(57) ABSTRACT

The invention refers to a frequency shifter for heterodyne interferometry measurements, comprising a chip, an input waveguide configured to guide a light beam, at least four phase modulators, each being arranged to receive the light beam from the input waveguide and configured to modulate a phase of the light beam, an output combiner being arranged to let the light beams modulated by each phase modulator interfere, a first output waveguide coupled to the output combiner and configured to receive the modulated
(Continued)

light beams constructively interfering at the output combiner, a second output waveguide coupled to the output combiner and configured to receive the modulated light beams destructively interfering at the output combiner, wherein the input waveguide, the phase modulators, the output combiner, the first output waveguide and the second output waveguide are arranged on the chip.

12 Claims, 2 Drawing Sheets

Related U.S. Application Data on Apr. 28, 2020, provisional application No. 62/946,929, filed on Dec. 11, 2019, provisional application No. 62/946,813, filed on Dec. 11, 2019, provisional application No. 62/946,860, filed on Dec. 11, 2019.

(51) Int. Cl.
| | | |
|---|---|---|
| *G01B 9/02001* | (2022.01) | |
| *G01K 1/14* | (2021.01) | |
| *G02B 6/293* | (2006.01) | |
| *G02F 1/21* | (2006.01) | |
| *G02F 1/225* | (2006.01) | |

(52) U.S. Cl.
CPC ........... *G01K 1/14* (2013.01); *G02B 6/29349* (2013.01); *G02F 1/212* (2021.01); *G02F 1/225* (2013.01)

(56) References Cited

U.S. PATENT DOCUMENTS

| | | | |
|---|---|---|---|
| 2003/0223674 A1 | 12/2003 | Bell, Jr. et al. | |
| 2012/0195544 A1* | 8/2012 | Shen | H04B 10/677 359/325 |
| 2014/0376001 A1 | 12/2014 | Swanson | |
| 2017/0299697 A1* | 10/2017 | Swanson | G02B 6/29302 |
| 2018/0238794 A1 | 8/2018 | Kangas et al. | |

FOREIGN PATENT DOCUMENTS

| | | | |
|---|---|---|---|
| JP | 08061912 A | 3/1996 | |
| WO | WO-2010021669 A2 * | 2/2010 | G02B 6/4207 |

OTHER PUBLICATIONS

English translation of JPH06148708. Obtained from Espacenet on Mar. 4, 2024. (Year: 2024).*
Cole, D. B. et al., "Integrated heterodyne interferometer with on-chip modulators and detectors", Optics Letters, Jun. 25, 2015, pp. 3097-3100, vol. 40, No. 13, Optical Society of America.
International Search Report and Written Opinion of the International Searching Authority, mailed Mar. 15, 2021, corresponding to PCT/IB2020/001033, 15 pages.
Izutsu, M. et al., "Integrated Optical SSB Modulator/Frequency Shifter", IEEE Journal of Quantum Electronics, Nov. 1, 1981, p. 2225, vol. QE-17, No. 11, IEEE.
Karlsson, C. J. et al., "All-fiber multifunction continuous-wave coherent laser radar at 1.55 μm for range, speed, vibration, and wind measurements", Applied Optics, Jul. 20, 2000, pp. 3716-3726, vol. 39, No. 21, Optical Society of America.
Liu, S. et al., "Precise Optical Frequency Shift Based on Radio-frequency Driven Single-sideband Modulator", 2014 Asia Communications and Photonics Conference (ACP), Nov. 11, 2014, pp. 1-3, Optical Society of America.
Poulton, C. V. et al., "Frequency-modulated Continuous-wave LIDAR Module in Silicon Photonics", OFC, Jan. 2016, 4 pages, Optical Society of America.
Schneider, S. et al., "Optical coherence tomography system mass-producible on a silicon photonic chip", Optics Express, Jan. 20, 2016, pp. 1573-1586, vol. 24, No. 2, Optical Society of America.
Shimotsu, S. et al., "Single Side-Band Modulation Performance of a $LiNbO_3$ Integrated Modulator Consisting of Four-Phase Modulator Waveguides", IEEE Photonics Technology Letters, Apr. 2001, pp. 364-366, vol. 13, No. 4, IEEE.

* cited by examiner

FREQUENCY SHIFTER FOR HETERODYNE INTERFEROMETRY MEASUREMENTS AND DEVICE FOR HETERODYNE INTERFEROMETRY MEASUREMENTS HAVING SUCH A FREQUENCY SHIFTER

CROSS-REFERENCE TO RELATED APPLICATION(S)

This application is a U.S. national stage entry, under 35 U.S.C. § 371, of International Application Number PCT/IB2020/001033, filed on Dec. 11, 2020, which claims priority to and the benefit of U.S. Provisional Application No. 62/946,813, filed Dec. 11, 2019, U.S. Provisional Application No. 62/946,860, filed Dec. 11, 2019, U.S. Provisional Application No. 62/946,929, filed Dec. 11, 2019, U.S. Provisional Application No. 63/016,897, filed Apr. 28, 2020, and U.S. Provisional Application No. 62/060,581, filed Aug. 3, 2020. The entire contents of all of the applications identified in this paragraph are incorporated herein by reference.

FIELD

One or more aspects of embodiments according to the present invention relate to a frequency shifter for heterodyne interferometry measurements, and more particularly to a frequency shifter for heterodyne interferometry measurements comprising phase modulators. Additional aspects of the invention relate to a device for heterodyne interferometry measurements having such a frequency shifter.

BACKGROUND

Optical frequency shifters are commonly used devices for the heterodyne interferometry measurements used in LiDAR, spectroscopy, and laser stabilization applications. Acousto-optic frequency shifters are typically used for fiber or free space interferometers; these devices, however, are not easily incorporated on-chip.

M. Izutsu et al., IEEE JSTQE, QE-17 (1981) and S. Shimotsu et al., IEEE PTL, 13 (2001) disclose a frequency shifter. D. B. Cole et al., Opt. Lett. 40 (2015) discloses a range-finding interferometer.

SUMMARY

It is in view of the above technical background, among other things, that the present disclosure is set forth.

According to a first aspect, a frequency shifter for heterodyne interferometry measurements comprises a chip, an input waveguide configured to guide a light beam, at least four phase modulators, an output combiner being arranged to let the light beams modulated by each phase modulator interfere, a first output waveguide, and a second output waveguide. Each phase modulator is arranged to receive the light beam from the input waveguide and configured to modulate the phase of the light beam. The first output waveguide is coupled to the output combiner and configured to receive the modulated light beams constructively interfering at the output combiner. The second output waveguide is coupled to the output combiner and configured to receive the modulated light beams destructively interfering at the output combiner. The input waveguide, the phase modulators, the output combiner, the first output waveguide and the second output waveguide are arranged on the chip.

According to a second aspect, a device for heterodyne interferometry measurements comprises the frequency shifter and a generator coupled to each of the phase modulators and configured to output a modulation signal to each of the phase modulators. The modulation signal defines the phase modulation. The modulation signal having a modulation frequency and a modulation phase. The generator is configured to generate the modulation signals such that at least two modulated light beams destructively interfere at the output combiner.

To create an on-chip frequency shifter, a combination of at least four electro-optic or free carrier phase shifters, driven at the appropriate radio frequency (RF) or microwave frequency and modulation index, and with the appropriate relative phases, may be used to generate a single sideband shifted from the optical carrier frequency by the drive frequency. However, heterodyne interferometry measurements require a local oscillator and frequency shifted probe beam. In some embodiments, the up-shifted and down-shifted sidebands are captured in separate output waveguides allowing one sideband to be used as the local oscillator and the other sideband to be used as a probe beam. This may result in a modulation efficiency of −1.7 dB while decreasing the required RF drive frequency by a factor of 2 for the same frequency shift (compared, for example, to a system in which probe beam is split off from the drive laser).

Optional features of the invention will now be set out. These are applicable singly or in any combination with any aspect of the invention.

The frequency shifter may further comprise a first splitter having two output ports and arranged between the input waveguide and the phase modulators, wherein preferably four phase modulators are provided, and wherein further preferably two phase modulators form part of a Mach-Zehnder interferometer which is respectively coupled to an output port of the first splitter.

The first output waveguide may be configured to emit the modulated light beams received from the output combiner to a surrounding of the chip.

The frequency shifter may further comprise a coherence detector having a first input port and a second input port, the coherence detector configured to detect differences in the amplitude and/or phase of light beams coupled in at the input port and the output port, wherein preferably the coherence detector is arranged on the chip.

The second output waveguide may be coupled to the first input port of the coherence detector.

The second input port may be coupled to a receiver structure, wherein preferably the receiver structure is at least partially arranged on the chip, and wherein further preferably the receiver structure is configured to receive light that has been emitted by the first output waveguide and backscattered by the surroundings of the chip.

Four phase modulators may be provided, wherein preferably the generator is configured to generate one modification signal having a set modulation frequency and a set phase, one modification signal having the set modulation frequency and the set modulation phase plus 90°, one modification signal having the negative set modulation frequency and the set modulation phase, and one modification signal having the negative set modulation frequency and the set modulation phase minus 90°.

The device may further comprise a heat controller, a temperature sensor arranged at an output waveguide assembly coupling the phase modulators to the output combiner, and/or a heater arranged at the output waveguide assembly, wherein preferably the temperature sensor is configured to measure at least a part of the output waveguide assembly and/or the heater is configured to heat at least a part of the output waveguide assembly, wherein further preferably the heat controller controls the heater based on the temperature detected by the temperature sensor such that an optical pathlength of the output waveguide assembly remains constant.

The device may further comprise an output waveguide assembly connecting the phase modulators to the output combiner, wherein preferably the output waveguide assembly includes a Y-branch combiner and/or an 2×2 coupler, wherein further preferably a first output of the 2×2 coupler is coupled to the output combiner and a second output of the 2×2 coupler is coupled to a control photodetector.

The first output waveguide and/or the second output waveguide may include an output splitter, an output port of the output splitter is coupled to a control photodetector.

The generator may generate the modulation signal based on a value output by the control photodetector and/or the heat controller controls the heater based on the value output by temperature sensor.

Further optional features of the invention are set out below.

BRIEF DESCRIPTION OF THE DRAWINGS

Embodiments of the invention will now be described by way of example with reference to the accompanying drawings in which.

DETAILED DESCRIPTION

Figure 1:
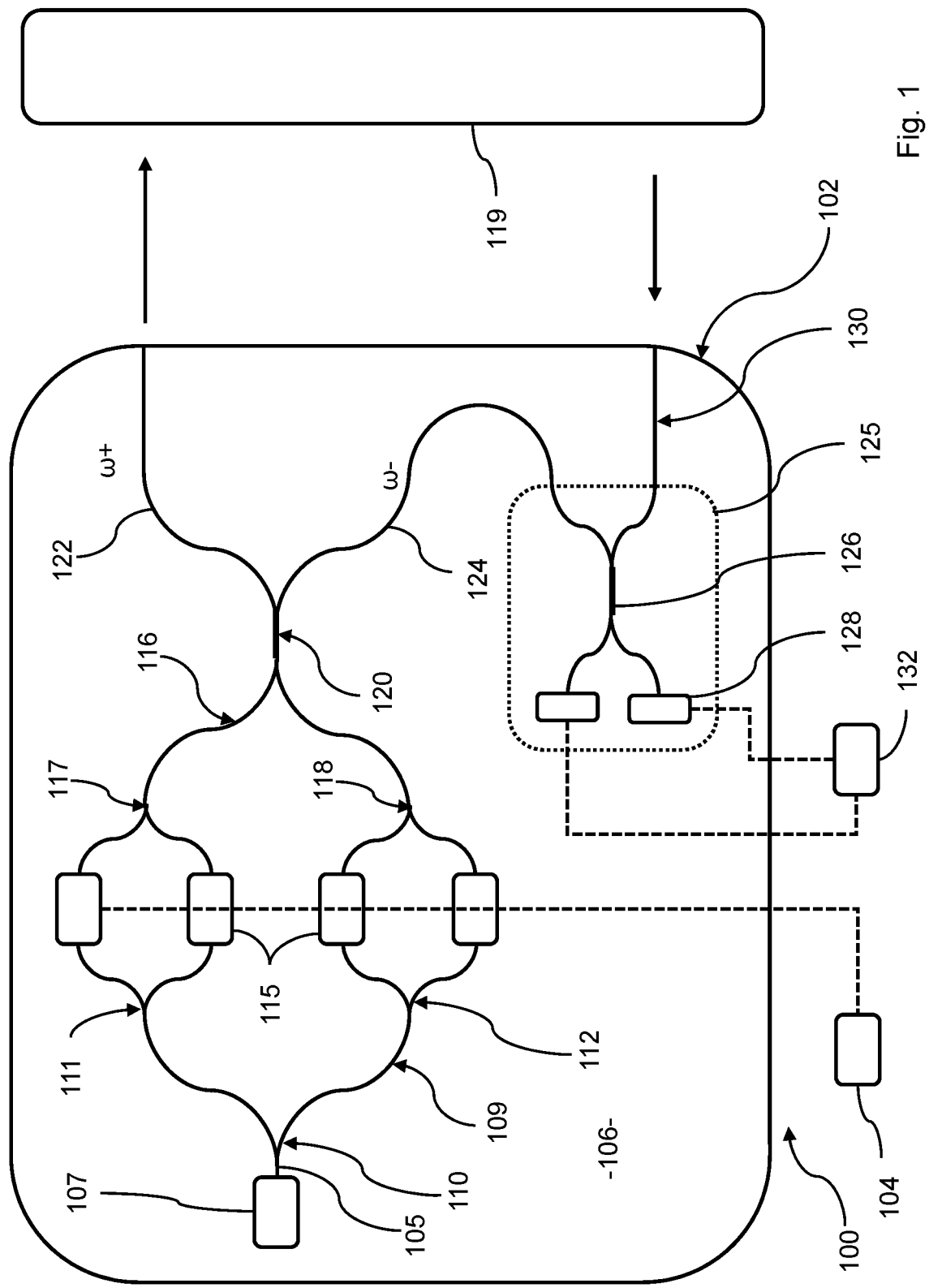
FIG. 1 is a schematic representation of a device for heterodyne interferometry measurements according to a first embodiment of the present invention.

The detailed description set forth below in connection with the appended drawings is intended as a description of exemplary embodiments of a sensing module provided in accordance with the present invention and is not intended to represent the only forms in which the present invention may be constructed or utilized.

In some embodiments, the frequency shifter and the device may be used for optical heterodyne interferometry. Optical heterodyne interferometry is a method of extracting information encoded as modulation of the phase and/or frequency of electromagnetic radiation, for example in the wavelength band of visible or infrared light. The light signal is compared with standard or reference light from a "local oscillator" (LO) that has a fixed offset in frequency and/or phase from the signal if the latter carried null information. "Heterodyne" defines that more than one frequency of the electromagnetic radiation is used.

The comparison of the two light signals is accomplished by combining them in a photodetector. To this end, the photodetector may have a response that is linear in energy, and hence quadratic in amplitude of electromagnetic field. Typically, the two light frequencies are similar enough that their difference or beat frequency produced by the detector is in the radio or microwave band that can be processed by electronic means.

To create an on-chip frequency shifter, a combination of four or more electro-optic or free carrier phase shifters driven at the appropriate relative radio frequencies or microwave frequencies and modulation indices are used to generate a single-side band shifted from the optical carrier frequency by the drive frequency. However, these devices have a theoretical maximum conversion efficiency of −4.7 dB (34%).

The theoretical maximum conversion efficiency of electro-optic phase modulator-based single sideband modulation is −4.7 dB (see M. Izutsu et al., IEEE JSTQE, QE-17 (1981)). For a topology that uses two such modulators, like the silicon photonic range-finding interferometer demonstrated by D. B. Cole et al., Opt. Lett. 40 (2015), the losses are doubled resulting in −7.7 dB (17%) modulation efficiency. The invention described here improves the modulation efficiency for topologies where two sidebands are required by a factor of 4 to a modulation efficiency of −1.7 dB (68%).

This invention modifies the conventional electro-optic phase modulator based single sideband modulation topology by replacing the final Y-branch combiner of prior art systems with a (50/50) directional coupler or (output) combiner. The Y-branch combiner scatters the down-shifted sideband into radiation modes (see FIG. 2 of S. Shimotsu et al., IEEE PTL, 13 (2001)), resulting in a contribution of −3 dB of the −4.7 dB total modulation efficiency. However, heterodyne interferometry measurements require a local oscillator and frequency shifted probe beam. By replacing the final Y-branch combiner with a directional coupler, the up-shifted and down-shifted sidebands are captured in separate output waveguides allowing one sideband to be used as the local oscillator and the other sideband to be used as a probe beam. This increases the modulation efficiency to −1.7 dB while decreasing the required drive frequency by a factor of 2 for the same frequency shift.

The chip may be a large waveguide silicon photonics (SiPh) platform or silicon on oxide chip (or silicon on insulator (SOI) chip). The input waveguide, the first output waveguide, the second output waveguide and/or any other waveguide described herein may be waveguides that can handle high power with low loss. Such waveguides may have a height of between 0.5 microns and 5 microns (where, e.g., in a SiPh chip fabricated on an SOI wafer the height may be measured from the BOX layer (which may operate as a lower cladding layer) to the top of the waveguide, the direction of the measurement being perpendicular to the plane of the SOI wafer). For example, the optical chip may include waveguide silicon photonics (SiPh) platform as the chip, with rib waveguides having a height of approximately 3 microns for the first and/or second waveguides.

The light beam coupled into the first waveguide may be generated by a light source which is optionally arranged on the chip. For example, the light source may be in direct contact with the input waveguide. However, the light source may be spaced apart from the input waveguide. For example other optical components may be arranged between the light source and the input waveguide. The arrangement of the light source on the chip provides a stable spatial relationship between the light source and the input waveguide; in particular, the optical path from the light source through the input waveguide remains constant. If the light source is in direct contact with the input waveguide, transmission losses due to reflections at interfaces between the light source and the input waveguide can be minimized.

In an alternative embodiment, the light source is arranged outside or external to the chip. For example, the light source may be on a separate chip. This allows to use light sources which cannot be arranged on the chip due to size or dimensional constraints.

The light source may include a laser (i.e. not a LED). The power output of the light source may be approximately 10 mW and in some embodiments upwards to 100 mW or more. In some embodiments, the laser is not a vertical-cavity surface-emitting laser (VCSEL). The laser may be distributed feedback (DFB) laser (but also may be a distributed Bragg reflector (DBR) laser, or FP (Fabry Perot) laser), and may be tunable. The laser may be tunable over a relatively narrow range, for example simply to trim the wavelength in response to the natural wavelength drift of devices, or they may be tunable over a wider range in order to change the operating wavelength of the laser in response to the demands of the spectroscopy. The laser (which may be a III-V laser) may be placed by micro transfer printing (MTP).

Preferably, the laser of the light source may be a non-tunable laser since the modulation or tuning is achieved by using the phase modulators. Thus, the laser and/or the light source is configured to generate a light beam having a fixed (temporally constant) wavelength or frequency. Thus, the light source may be configured to emit a light beam having a temporally constant amplitude, wavelength and/or phase. Optionally, the light source solely consists of one laser.

The phase modulator may include any electro-optical component which is configured to modulate/change/vary the phase of an incoming light beam such as the light beam from the input waveguide. Thereby, the phase modulator may be configured not to change/alter the wavelength and/or the amplitude of the incoming light beam. Preferably, the phase modulator is configured to induce a phase shift in the incoming light beam whereby the phase shift is temporarily varying. For example, the phase shift generated by the phase modulator has a frequency in a radio frequency range and/or microwave frequency range. The phase shift applied to the incoming beam by the phase modulator may depend on an external modulation signal which may be generated by the generator described below.

The phase modulator may include an electro-optic phase shifter and/or a free carrier phase shifter. The frequency shifter may include an input waveguide assembly which connects the input waveguide to the four phase modulators. The input waveguide assembly may include one or more waveguides and one or more splitters which may comprise a Y-branch splitter or a directional coupler. For example, the input waveguide assembly includes a first splitter which is coupled to (e.g. directly connected) to the input waveguide in order to split the light beam into two separate light beams. A first output of the first splitter may be coupled to a second splitter and/or a second output of the first splitter may be coupled to a third splitter. The second splitter and/or the third splitter may be directly connected to the first splitter or additional waveguides are arranged between the first splitter and the second splitter/third splitter. The outputs of the second splitter and the third splitter are coupled to the phase modulators, either directly or by means of further waveguides. The first splitter, the second splitter, the third splitter and the other waveguide described herein may have the features and/or characteristics of the input waveguide described above.

The first splitter, the second splitter and/or the third splitter may split the incoming light beam with respect to its intensity, amplitude or energy, but independent from its frequency or phase. For example, the two split light beams emitted from the respective splitter may have equal intensity; in other words, the first splitter, the second splitter and/or the third splitter may be a 50/50 splitter. Preferably, the ratio between the intensity of the transmitted light beam and the intensity of the reflected light beam is independent of the wavelength.

The frequency shifter may further include an output waveguide assembly connecting the phase modulators to the output combiner. The output waveguide assembly may include one or more waveguides and/or one or more combiners which each may include a Y-branch combiner and/or a directional coupler. For example, a first combiner of the output waveguide assembly is arranged to combine the light beams modulated by two of the phase modulators. A second combiner of the output waveguide assembly may be arranged to combine the light beams modulated by two other phase modulators. The output combiner is coupled to the output waveguide assembly and is optionally arranged to combine the light beams outputted by the first combiner and the second combiner. It is possible that waveguides or other optical components may be arranged between the first combiner and the output combiner and/or the second combiner and the output combiner.

Each of the combiners mentioned above may be any (passive) optical component which configured to combine the light beams from the respective inputs, preferably independent of frequency, phase, and/or amplitude, and to output the combined light beam.

The output combiner is preferably a coherent combiner, for example Y-branch combiner or a directional coupler, for example a 50/50 coupler. The output combiner may have two input ports and two output ports. One input port may be connected to (or coupled to) the first combiner and/or the other input port may be connected to (or coupled to) the second combiner. One output port may be (directly) connected to (or coupled to) the first output waveguide and/or the other output port may be (directly) connected to (or coupled to) the second output waveguide. In particular, it is possible that optical components may be arranged between the output combiner and the first output waveguide and/or the second output waveguide. Thus, light beams outputted by the output combiner are coupled to the first output waveguide and the second output waveguide. The ratio of the intensity of the light beams coupled into the first waveguide and the intensity of the light beams coupled into the second waveguide may be appropriately set by choosing the adequate type of output combiner.

The output combiner is configured in such a way that light beams that constructively interfere at the output combiner are coupled into the first output waveguide. In addition, the output combiner is configured to in such a way that light beams that destructively interfere at the output combiner are coupled into the second output waveguide. Thus, the output combiner may be configured to direct/route incoming light beams into the first output waveguide and the second output waveguide depending on whether or not the incoming light beams constructively interfere at the output waveguide.

The optical pathlength from the respective phase modulators to the output combiner may be identical to each other and temporally constant. For example, the respective distances along the different branches of the output waveguide assembly from the phase modulators to the output combiner may be the same. However, the same optical pathway may be achieved by providing additional optical components in the output waveguide assembly for ensuring that each branch from the respective phase modulated to the output combiner has the same optical pathlength. Thus, there may be no change in the phase difference between the modulated light beams directly after the phase modulators compared to within the output combiner. Therefore, the phase modulation applied to the light beams by the phase modulators and, thus, the phase differences between the different light beams modulated by the respective phase modulators is present at the output combiner.

The phase modulators, the input waveguide assembly and/or the output waveguide assembly form two a Mach-Zehnder Interferometers (MZI) which are arranged in parallel. In particular, two phase modulators in conjunction with parts of the input waveguide assembly and the output waveguide assembly form a Mach-Zehnder Interferometer. In detail, the second splitter, two of the phase modulators, and the first combiner form a first Mach-Zehnder Interferometer, while the third splitter, two of the phase modulators, and the second combiner form a second Mach-Zehnder Interferometer.

The generator is electronically connected to each of the phase modulators. The generator generates modulation signals, whereby each modulation signal is different. Thus, each phase modulator receives a different modulation signal. The modulation signal includes a modulation frequency and a modulation phase. The modulation signal corresponds to the phase shift to be applied by the respective phase modulator to an incoming light beam. The generator is thus configured to generate at least four electronic wave signals each having a respective wavelength and phase. The generator may be a signal or frequency generator.

The modulation frequency corresponds to the frequency of the phase shift applied to the incoming light beam by the respective phase modulator. The modulation phase is the phase of the phase shift applied to the incoming light beam by the respective phase modulator. Thus, two modulation signals having the same modulation frequency but different modulation phase may be regarded in that the same modulation signal is applied to different phase modulators but at different points of time.

The modulation signals generated by the generator have modulation frequencies and modulation phases such that the light beams modulated by the phase modulators constructively and destructively interfere at the output combiner. In detail, two light beams may constructively interfere and two light beams may destructively interfere at the output combiner. However, the invention is not limited thereto. There may be five or more phase modulators whose modulated light beams may be combined at the output combiner (for example by additional combiner within the output waveguide assembly). There again, part of the light beams constructively interfere at the output combiner. Those light beams are coupled into the first output waveguide while the light beams destructively interfering at the output combiner are coupled into the second output waveguide.

In case of four phase modulators, a first modulation signal may have a set or predetermined modulation frequency and a set or predetermined modulation phase. For example, the modulation frequency may be $\omega+$ which may be in the radio frequency range or micro frequency range. The predetermined modulation phase may be zero. A second modulation signal may have the same set or predetermined modulation frequency $\omega+$. The modulation phase of the second modulation signal may be the modulation phase of the first modulation signal plus 90°, for example 90°. A third modulation signal may have the same value of the modulation frequency of the first modulation signal however with the opposite sign, for example $\omega-$. The modulation phase of the third modulation signal may be the same modulation phase as the first modulation signal. A fourth modulation signal may have to same modulation frequency $\omega-$ as the third modulation signal. The modulation phase of the fourth modulation signal may be a modulation phase of the first modulation signal minus 90°, for example −90°.

Thus, the first and second modulation signals have to same modulation frequency. In addition, the third and fourth modulation signals have the same modulation frequency which is the opposite of the modulation frequency of the first and second modulation signals. The first and second modulation signals thus rotate in a different direction compared to the third and fourth modulation signals. The modulation phases of the first and third modulation signals are the same. In this scenario, the light beams modulated according to the first and third modulation signals constructively interfere at the output combiner, while the light beams modulated according to the second and fourth modulation signals destructively interfere at the output combiner. Thus, the light beams propagating in the first output waveguide have the modulation frequency $\omega+$ while the light beams propagating in the second output waveguide have the modulation frequency $\omega-$. The light beams propagating in the first waveguide may be used as a probe beam while the light beams propagating in the second waveguide may be used as a reference beam or in other words as a local oscillator.

The different types of combiners and the phase modulators described herein are arranged on the chip.

The light beam propagating in the first output waveguide (the probe beam) may be directed to a sample to be analyzed. To this end, the first output waveguide may be coupled to optical components, such as one or more lenses or lens system, for focusing and/or directing the light beam propagating in the first output waveguide onto the sample. The sample is external to the chip. The optical components may be arranged outside or external to the chip. For example, the light beam propagating in the first output waveguide exits the first output waveguide at an end face thereof. The end face of the first output waveguide may coincide with an edge of the chip.

The frequency shifter may further include a coherence detector having a first input port and a second input port. The coherence detector is configured to detect differences in the amplitude and/phase of light beams coupled in at the input port and the output port. For example, the coherence detector is a coherent detector. The coherence detector may be a balanced or unbalanced detector. The coherence detector may include one or more photodetectors and a receiver combiner/coupler.

The photodetector may have one or more wavelength filters (or none). Detection may be direct or coherent with possible enhanced signal-to-noise ratio (SNR). Amplitude, phase, and/or frequency modulation of the light source can be available and can provide various information about the sample or enhance the SNR.

The photodetector may include an AC coupled photodiode or a focal plane array detector. The photodetector may include (e.g., consist of) one detector. In some embodiments, the photodetector includes one or more photodiodes.

The photodetector may has a detection rate sufficient to detect amplitude variations having a frequency corresponding to the modulation frequency of the phase modulators. For example, the frequency of the wavelength variation of the phase modulators may be in the radio frequency range such that the photodetector is capable of detecting amplitude variations is in the radio frequency range.

An unbalanced coherence detector may include one photodetector and one receiver combiner. The receiver combiner combines the light beams coupled in at the first input port and the second input port and routes/directs the combined light beams to the photodetector.

A balanced coherence detector may include two photodetectors and one receiver coupler which may be a directional 2×2 coupler or 50/50 coupler. The output ports of the receiver coupler may each be connected to a respective photodetector. The input ports of the receiver coupler correspond to the first input port and a second input port.

The device may also include an analysis device which is connected to the coherence detector. The analysis device may be arranged external to the chip. The analysis device may include a processor and/or other electrical components for analyzing the interference pattern detected by the coherence detector.

The coherence detector, in particular the photodetectors and/or the receiver couple/combiner, are arranged on the chip.

The first input port of the coherence detector may be coupled to the second output waveguide. To this end, the second output waveguide may be directly connected to the input port of the coherent detector.

The second input port of the coherence detector may be configured and arranged to receive light backscattered from the sample, in particular the backscattered probe beam (i.e. originally coming from the first output waveguide). To this end, the frequency shifter may include a receiver structure. The receiver structure is configured and arranged to collect light backscattered from the sample and to couple it into the second input port of the coherence detector. The receiver structure may include one or more lenses and/or a receiver waveguide. The one or more lenses may be arranged external to the chip and/or are configured to focus light into the receiver waveguide. The receiver waveguide may be arranged on the chip and can be directly connected to the second input port of the coherence detector.

The device may further comprise a heat controller, a temperature sensor and/or a heater. The heat controller may be arranged external to the chip and/or is electronically coupled to the generator. The temperature sensor and/or the heater may be arranged on or below the chip. A plurality of temperature sensors and/or heaters may be provided. The temperature sensor may be configured to measure the temperature of the surroundings. The temperature sensor is preferably in direct contact with the output waveguide assembly. In particular, the temperature sensor is in direct contact with waveguides of the output waveguide assembly. For example, some branches or all branches of the output waveguide assembly are provided with the temperature sensors. Thus, it is possible to simultaneously measure the temperature of one or more branches of the output waveguide assembly.

Similarly, the one or more heaters may be provided for heating parts of the output waveguide assembly. Each heater may be in direct contact with a part of the output waveguide assembly and may be configured to generate heat for heating the output waveguide assembly. One heater can heat one or more branches of the output waveguide assembly. It is preferred that each heater heats a respective branch of the output assembly. In particular, each heater is associated with a respective sensor of the temperature sensor such that each heater can be controlled based on the temperature detected with the associated temperature sensor.

The heater and the temperature sensor, in particular the temperature sensors and the heaters, are electronically coupled to the heat controller. The heater may be provided to ensure that the optical pathlength in each branch remains constant. Temperature changes cause the waveguide refractive index to change via the material thermo-optic coefficient, which in turn changes the optical pathlength and thus the relative phase between arms of the MZI. The heat controller controls the heater accordingly, i.e. such that the optical path length in each of the branches of the output waveguide assembly remains constant and/or the same.

The output waveguide assembly may include a 2×2 coupler is instead of a Y-branch combiner. The first combiner may be 2×2 coupler. For example, one of the two output ports of the coupler is connected to the output combiner while the other output port is coupled to a control photodetector. Similarly, the second combiner may additionally or alternatively may be 2×2 coupler. Here again, one of the two output ports of the coupler is connected to the output combiner while the other output port is coupled to a control photodetector.

The control photodetectors may be configured as the photodetectors described above. The control photodetector may be electronically coupled to the generator. The generator may adjust the modulation signals depending on the measurements of the control photodetector. The first input waveguide and/or the second input waveguide may include an output splitter, wherein an output port of the output splitter is coupled to a control photodetector. The splitter may be a Y-branch splitter or a directional coupler. The control photodetector may also be electronically coupled to the generator which may adjust the modulation signal depending on the measurements of the control photodetector.

Turning to FIG. 1, a device 100 for heterodyne interferometry measurement includes a frequency shifter 102 and a generator 104. The frequency shifter 102 may be arranged on a chip 106. The generator 104 may be arranged outside or external to the chip 106.

The frequency shifter 102 may include a light source 107, an input waveguide 105, an input waveguide assembly 109, phase modulators 115, an output waveguide assembly 116, an output combiner 120, a first output waveguide 122, a second output waveguide 124, and/or a coherence detector 125.

The light source 107 may be configured to emit a coherent light beam having a fixed wavelength. The light source 107 may be a laser. The light beam emitted by the light source 107 is coupled into the input waveguide 105. For example, the light source 107 is directly connected to the input waveguide 105. The input waveguide 105 may be coupled to (for example directly connected to) the input waveguide assembly 109. The input waveguide assembly 109 is configured and arranged to split the light beam propagating in the input waveguide 105 to the phase modulators 115.

The input waveguide assembly 109 may include a first splitter 110, a second splitter 111, and/or a third splitter 112, which each may include a Y-branch splitter or a directional coupler. Each splitter 110, 111, 112 may be configured to split the incoming light beam into two identical light beams having the same intensity. Each splitter 110, 111, 112 may work independent of the wavelength of the incoming light beam. In addition, the input waveguide assembly 109 may include one or more waveguides connecting the respective splitters 110, 111, 112.

The input waveguide 105 may be coupled to the first splitter 111. An output port of the first splitter 110 may be coupled to the second splitter 111. Another output port of the first splitter 110 may be coupled to the third splitter 112. Each output port of the second splitter 111 and the third splitter 112 is coupled to a respective phase modulator 115.

The phase modulators 115 are connected to the output combiner 120 by the output waveguide assembly 116 which may include a first combiner 117 and/or a second combiner 118. The first combiner 117 and/or the second combiner 118 may be a coherent combiner, such as a Y-branch combiner or a directional coupler. Each phase modulator 115 is coupled to an input port of the first combiner 117 and/or the second combiner 118. The output ports of the first combiner 117 and/or the second combiner 118 are coupled to the output combiner 120. The output waveguide assembly 116 may further comprise waveguides which couple the phase modulators 115 to the first combiner 117 and/or the second combiner 118 and/or which couple the first combiner 117 and/or the second combiner 118 to the output combiner 120.

A first output port of the output combiner 120 is coupled to the first output waveguide 122, while a second output port of the output combiner 120 is coupled to the second output waveguide 124. The output combiner 120 may be a coherent combiner, such a directional coupler or a 50/50 coupler.

The output combiner 120 is configured to direct/route light beams constructively interfering at the output combiner 120 into the first output waveguide 122 and the light beams destructively interfering at the output combiner 120 into the second output waveguide 124. The light beams constructively and destructively interfering at the output combiner 120 come from and are modulated by the phase modulators 115. To this end, the optical pathlength from each phase modulator 115 to the output combiner 120 may be the same.

The input waveguide assembly 109, the phase modulators 115 and output waveguide assembly 116 may form to two Mach-Zehnder interferometers (MZI). The phase modulators 115 receive modulation signals from the generator 104. The modulation signal applied to a first phase modulator 115 may include a modulation frequency and a modulation phase. The modulation signal applied to a second phase modulator 115 may include the same modulation frequency and the modulation phase applied to the first phase modulator 115 plus 90°. The modulation signal applied to a third phase modulator 115 may include the same modulation frequency as the applied to the first phase modulator, multiplied by −1, and the same modulation phase applied to the first phase modulator number 115. The modulation signal applied to a fourth phase modulator 115 may include the same modulation frequency as the applied to the first phase modulator, but multiplied by −1 (i.e. the modulation frequency applied to the third phase modulator 115), and the modulation phase applied to the first phase modulator number 115 minus 90°.

The light beam propagating in the first output waveguide 122 corresponds to a probe beam and is emitted to the surroundings of the chip 106. The probe beam may be directed to a sample 119, for example using one or more lenses. Light backscattered by the sample 119 (i.e. the reflected or back scattered probe beam) may be collected by a receiver structure 130 which may be partially arranged on the chip 106.

The light beams propagating in the second output waveguide 124 may be used as the local oscillator and are coupled to the coherence detector 125. The second output waveguide 124 may be directly connected to the coherence detector 125. In the embodiment depicted in FIG. 1, the coherence detector 125 includes a receiver coupler 126 and two photodetectors 128. The second output waveguide 124 may be connected to an input port of the receiver coupler 126. The other input port of the receiver coupler 126 may be connected to the receiver structure 130.

The output ports of receiver coupler 126 are each coupled to the photodetectors 128 for providing a balanced coherent detector. The photodetectors 128 may be electronically coupled to an analysis device 132 which may be arranged external to the chip 106. The analysis device 132 may include a processor and/or other electrical components for analyzing the interference pattern detected by the photodetector 128.

The receiver structure 130 may include one or more lenses for collecting light (the probe beam) back scattered by the sample 119. The receiver structure 130 may also include a waveguide which may be arranged on the chip 106. The one or more lenses may be configured to direct/focus light back scattered from the sample 119 into the waveguide of the receiver structure 130. The one or more lenses may be arranged external to the chip 106.

The probe beam, i.e. the light beam propagating in the first output waveguide 122, directed onto the sample 119, scattered back by the sample 119, and coupled into the coherent detector 125 by the receiver structure 130 interferes on the photodetectors 128 with the reference beam which corresponds to the light beam propagating through the second output waveguide 124. This allows the ability to provide a heterodyne interferometry measurement.

The embodiment of FIG. 1 may be additionally or alternatively described as follows: light may be fed into a frequency shifter 102 on a laser input waveguide 105, and split into two paths by a first splitter 110. Each of the two paths includes a Mach-Zehnder interferometer (MZI). Each Mach-Zehnder interferometer has two phase modulators 115, one in each arm, driven out of phase, and each Mach-Zehnder interferometer is configured to operate as an amplitude modulator (or "MZI modulator"). The drive amplitude of each of the MZI modulators 115 is selected to produce suppressed-carrier amplitude modulation, and the drive signals of the two MZI modulators are selected to have a phase difference of 90 degrees, so that the amplitude modulation produced by one MZI modulator is 90 degrees out of phase with the amplitude modulation produced by the other MZI modulator 115. The effect of the phase difference is that, for example, when the two first sidebands (the first upper sideband and the lower first sideband (which, referenced to the input light, have phases rotating in opposite directions at the modulation frequency)) produced by the upper MZI modulator are in phase with each other, the two first sidebands of the lower MZI modulator have opposite phases.

The two amplitude modulated signals are combined in the output combiner 120. If the optical delays from each of the MZI modulators to the output combiner 120 are suitably chosen, constructive interference will occur at a first output (e.g., the upper output, as shown in FIG. 1) of the combiner 120 for one of the sidebands (e.g., the upper sideband, ω+, as shown in FIG. 1). Because the lower sidebands ω− are out of phase when the upper sidebands are in phase, they interfere destructively at the first output of the output combiner 120, and therefore interfere constructively at the second output (e.g., the lower output) of the output combiner 120, as shown. The upper sideband light may be transmitted (e.g. launched into free space for sensing, as in a LiDAR application) and the lower sideband light may be used as a local oscillator signal in a coherence detector 125 for detecting received reflected or backscattered light.

Figure 2:
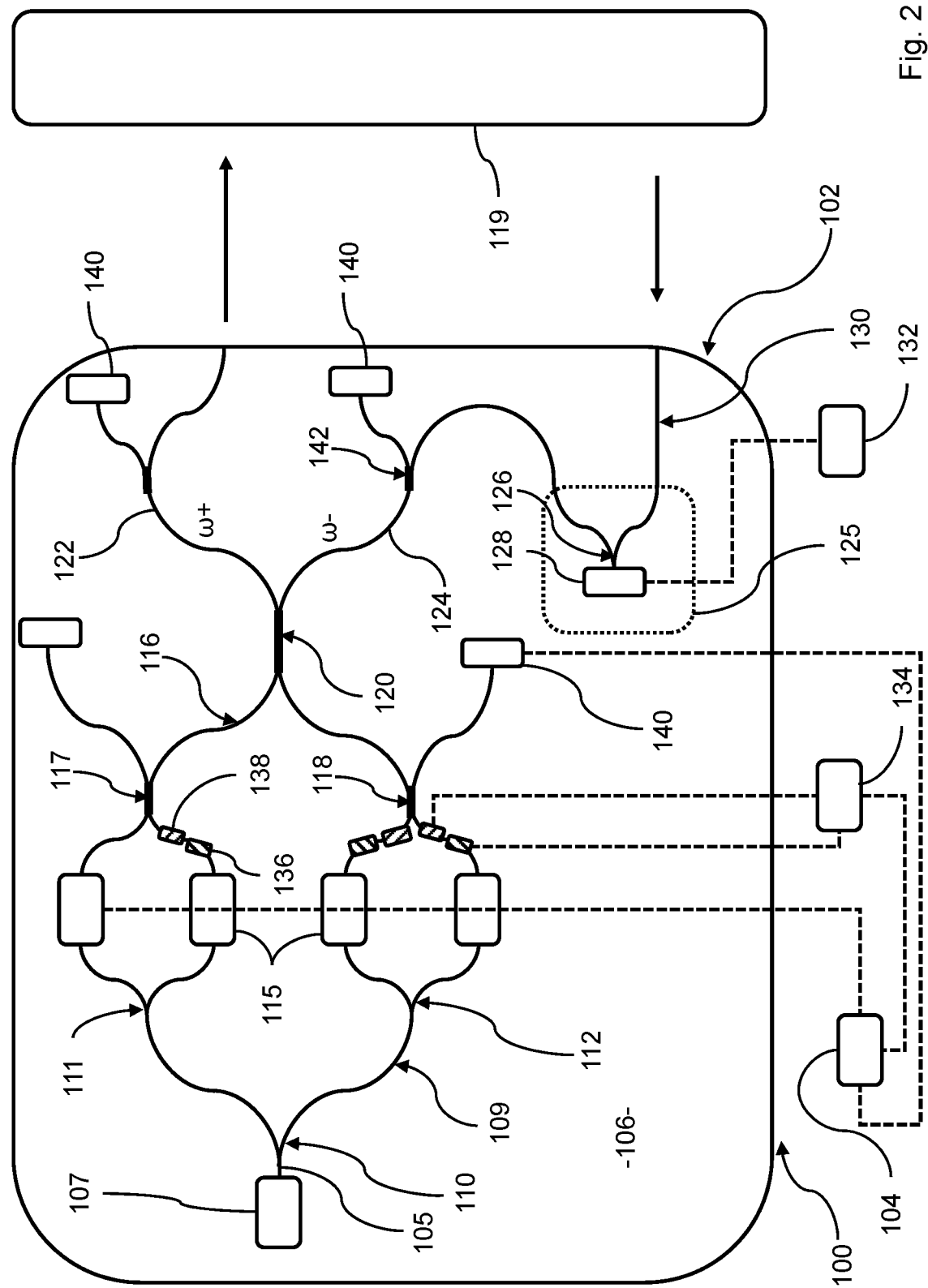
FIG. 2 is a schematic representation of a device for heterodyne interferometry measurements according to a second embodiment of the present invention.

Another embodiment of the device 100 is depicted in FIG. 2 which shares the same feature and/or characteristics as the embodiment of the device 100 depicted in FIG. 1 except for the following differences:

The device 100 may further include a heat controller 134, one or more temperature sensors 136, heaters 138 and/or control photodetectors 140. The heat controller 134 may be arranged external to the chip 106 and can include one or more processors. The heat controller 134 is provided for maintaining the optical pathlength between the phase modulators 115 and the output combiner 120 and/or between the input waveguide 105 and the phase modulators 115. All temperature sensors 136 and heaters 138 are electronically coupled to the heat controller 134 although not depicted in FIG. 2.

One or more temperature sensors 136 and/or heaters 138 are provided with the output waveguide assembly 116. For example, one, several or all branches of the input waveguide assembly 109 and/or the output waveguide assembly 116 may be provided with temperature sensors 136 and/or heaters 138. The temperature sensors 136 are configured to determine the temperature while the heaters 138 are configured to heat parts of the input waveguide assembly 109 and/or the output waveguide assembly 116 depending on the temperature measured by the temperature sensors 136.

The first combiner 117 and/or the second combiner 118 are constituted by a 2×2 coupler in the embodiment depicted in FIG. 2. One output port of the first combiner 117 and/or the second combiner 118 is each coupled to the output combiner 120. The other output port of the first combiner 117 and/or the second combiner 118 is each coupled to the control photodetectors 140. The control photodetectors 140 are electronically coupled to the generator 104 which adjust the modulation signal depending on the measurements made by the control photodetectors 140.

The device 100 according to the embodiment depicted in FIG. 2 may also include one or more output splitters 142 which are coupled to the first output waveguide 122 and/or the second output waveguide 124. One output port of the output splitter 142 may be coupled to an additional control photodetector 140 which is also electronically coupled to the generator 104 although not indicated in FIG. 2. The measurement of the control detectors 140 coupled to the first output waveguide 122 and/or the second output waveguide 124 may be additionally used to adjust the modulation signals fed to the phase modulators 115.

The temperature measured by the temperature sensors 136 may be forwarded to the generator 104. To this end, the temperature sensor 136 may be directly coupled to the generator 104 or the temperature measurement signals are forwarded to the generator 104 via the heat controller 134. The modulation signals may also be adjusted by the generator 104 depending on the temperature measured by the temperature sensors 136.

The embodiment of FIG. 2 may be additionally or alternatively described as follows: active control is used to control the optical phase difference of the two amplitude modulated optical signals arriving at the output combiner 120. For example, the temperature may be actively stabilized using one or more temperature sensors 136 and heaters 138. In some embodiments, each of the MZI modulators has at its output a 2×2 coupler (instead of a Y-branch coupler as shown in FIG. 1), for combining the light from the two phase modulators 115. In such an embodiment, each of the phase modulators 115 has two outputs (carrying complementary signals), one of which is connected to the output combiner 120. The other output of each of the phase modulators 115 may be used as feedback for tuning the RF drive signals and thermal tuners.

What is claimed is:

1. A frequency shifter for heterodyne interferometry measurements, comprising
   a chip,
   an input waveguide configured to guide a light beam,
   at least four phase modulators, each being arranged to receive the light beam from the input waveguide and configured to modulate a phase of the received light beam and to output a respective modulated light beam,
   an output combiner being configured to combine all of the modulated light beams,
   a first output waveguide coupled to the output combiner and configured to receive a portion of each of the modulated light beams, and
   a second output waveguide coupled to the output combiner and configured to receive a portion of each of the modulated light beams,
   wherein the input waveguide, the phase modulators, the output combiner, the first output waveguide and the second output waveguide are arranged on the chip.

2. The frequency shifter of claim 1, further comprising a first splitter having two output ports and arranged between the input waveguide and the phase modulators, wherein two of the phase modulators form part of a Mach-Zehnder interferometer which is respectively coupled to an output port of the first splitter.

3. The frequency shifter of claim 1, wherein the first output waveguide is configured to emit the modulated light beams received from the output combiner to a surrounding of the chip.

4. The frequency shifter of claim 1, further comprising a coherence detector having a first input port and a second input port, the coherence detector configured to detect differences in the amplitude and/or phase of light beams coupled in at the first input port and the second input port, wherein the coherence detector is arranged on the chip.

5. The frequency shifter of claim 4, wherein the second output waveguide is coupled to the first input port of the coherence detector.

6. The frequency shifter of claim 4, wherein the second input port is coupled to a receiver structure, wherein the receiver structure is at least partially arranged on the chip, and wherein the receiver structure is configured to receive light emitted by the first output waveguide and backscattered by the surroundings of the chip.

7. A device for heterodyne interferometry measurements, comprising
   the frequency shifter of claim 1; and
   a generator coupled to each of the phase modulators and configured to output a modulation signal to each of the phase modulators, the modulation signal defines the phase modulation, the modulation signal having a modulation frequency and a modulation phase,
   wherein the generator is configured to generate the modulation signals such that at least two modulated light beams destructively interfere at the output combiner.

8. The device of claim 7, wherein the generator is configured to generate one modification signal having a set modulation frequency and a set phase, one modification signal having the set modulation frequency and the set modulation phase plus 90°, one modification signal having the negative set modulation frequency and the set modulation phase, and one modification signal having the negative set modulation frequency and the set modulation phase minus 90°.

9. The device of claim 7, further comprising a heat controller, a temperature sensor arranged at an output waveguide assembly coupling the phase modulators to the output combiner, and/or a heater arranged at the output waveguide assembly, wherein the temperature sensor is configured to measure at least a part of the output waveguide assembly and/or the heater is configured to heat at least a part of the output waveguide assembly, wherein the heat controller controls the heater based on the temperature detected by the temperature sensor such that an optical pathlength of the output waveguide assembly remains constant.

10. The device of claim 9, further comprising an output waveguide assembly connecting the phase modulators to the output combiner, wherein the output waveguide assembly includes a Y-branch combiner and/or an 2×2 coupler, and wherein a first output of the 2×2 coupler is coupled to the output combiner and a second output of the 2×2 coupler is coupled to a control photodetector.

11. The device of claim 10, wherein the first output waveguide and/or the second output waveguide include an output splitter, an output port of the output splitter is coupled to a control photodetector.

12. The device of claim 10, wherein the generator generates the modulation signal based on a value output by the control photodetector and/or the heat controller controls the heater based on the value output by the temperature sensor.

* * * * *